United States Patent Office 2,797,206
Patented June 25, 1957

2,797,206

STABLE MELAMINE-UREA RESIN SYRUP

Tzeng Jiueq Suen and Sewell T. Moore, Stamford, Conn., assignors to American Cyanamid Company, New York, N. Y., a corporation of Maine No Drawing. Application December 2, 1952,
Serial No. 323,695

5 Claims. (Cl. 260—67.6)

The present invention relates to novel thermosetting aqueous methanol-modified melamine-urea formaldehyde resinous syrups having a novel combination of advantageous properties, to the manufacture of these syrups, and to cellulosic products and textiles containing the same.

The manufacture of resinous melamine-urea formaldehyde syrups and the formation of colloidal, cationic dispersions therefrom are disclosed in Wohnsiedler et al. U. S. Patent No. 2,485,080. The resinous syrups produced by the method of this patent, however, are unstable: on storage at normal temperatures, the resin content thereof continues to polymerize, ultimately precipitating or passing into the gel condition and preventing formation of the cationic acid colloid. As a result, it has been found necessary to convert these syrups as soon as they have been prepared into a form in which further polymerization cannot take place, and in practice the syrups are spray-dried to dry powders. The steps of spray-drying or otherwise drying the syrup, bagging the dry resins thus produced, handling the bags of resin, and finally dispersing the dry resins in dilute acid without forming gelatinous lumps are troublesome steps which increase the cost of the resins and therefore the cost of wet strength paper made therefrom. The same disadvantages apply when the resins are used for the treatment of textile fabrics.

We have discovered that aqueous alcoholic melamine-urea-formaldehyde syrups can be prepared having the composition described below which possess the following novel and most useful properties and characteristics:

1. The syrups remain stable for six months or more when stored at normal temperatures, that is, at 40° C. or below.
2. The weight of combined urea in the syrups is up to about 100% of the weight of combined melamine therein.
3. The weight of the resin content is as high as 85% of the weight of the syrups.
4. The viscosity of the syrups is within the pumpable range.
5. The syrups form stable, colloidal, strongly cationic dispersions when diluted with acidulated water and aged.

The resinous syrups are prepared by reacting urea, melamine, formaldehyde and methanol in the presence of water in the following molar ratios:

| Reagents | Molar Ratios |
| --- | --- |
| Urea/melamine | 1.0–2.0 |
| $CH_2O$/melamine-urea amino groups | 0.9–1.3 |
| Methanol/$CH_2O$ | 0.4–1.0 |
| Water/methanol | 0.6–1.2 |

In determining the ratio "$CH_2O$/melamine-urea amino groups," melamine is regarded as having three amino groups and urea as having two, and the number of amino groups is found by multiplying the number of mols of urea by two and the number of mols of melamine by three, and totalling. The number of mols of $CH_2O$ which are taken in each instance is determined by multiplying the total thus obtained by a number between about 0.9 and 1.3, as shown in the table.

According to this table, the weight ratio of the urea to the melamine is between about 1:2 and 1:1, the weight ratio of the methanol to the formaldehyde is between about 1:2 and about 1:1, and the weight ratio of the water to the methanol is between about 1:3 and about 2:3.

In condensations of the type described in the Wohnsiedler et al. patent a graph of the reaction rate in terms of active groups reacted, when plotted on coordinate paper in which time is the abscissa and rate of reaction the ordinate, normally falls steeply at the beginning and tends to level off only slightly thereafter. The graph thus represents the fact that the reaction proceeds fairly rapidly through its entire course until the gel stage is reached. The primary technical basis of the present invention is our discovery that when melamine, urea, formaldehyde and methanol are reacted in the presence of water in the molar proportions and under the conditions herein set forth, the slope of the graph becomes substantially horizontal in its latter part far in advance of the time at which the gel condition is reached, and that while polymerization is proceeding along this substantially horizontal portion of the curve, the resin is of pumpable viscosity and is fully suitable for the purposes stated above.

The invention is further based on our discovery that when the resinous syrup is maintained at pH 7–10 and at a temperature below about 40° C., the slope of the graph is almost precisely horizontal and the rate of condensation therefore negligibly low. The temperature of 40° C. is above the maximum summer temperature at which resinous syrups of this type are stored and shipped. From this it is evident that the syrups of the present invention are inherently stable when stored at normal temperatures.

In the preparation of the syrups, preferably the reagents are mixed in the ratios shown in the table above, and the mixture heated to between about 60° C. and the reflux point of the mixture, about 80°–90° C. Reaction is sufficiently complete and formation of a syrup of satisfactory stability results when the syrup reaches the "0° C. hydrophobe" stage, that is, the stage at which a drop of the syrup forms a milky streak when allowed to fall into a large volume of ice water. The reaction may be continued but as it proceeds, the viscosity finally passes through the pumpable range and the syrup becomes unstable, ultimately forming a gel.

A viscosity of about Z–2 on the Gardner-Holdt scale at 25° C. represents a syrup of about maximum pumpable viscosity, and we prefer to terminate the reaction at an intermediate point, that is, when the syrup has passed the 0° C. hydrophobe stage and has attained a Gardner-Holdt viscosity of between about N and W, such syrups being very stable and pumpable and yielding stable, highly active colloidal cationic dispersions when treated with dilute acid as described below.

Upon completion of the condensation reaction the syrup is cooled and stored at below about 40° C. after adjustment of its pH to between about 7 and 10.0. A final pH of 7.5 to 9 is preferred, this pH providing a syrup of the greatest stability which yields the most efficient acid colloid.

The reaction may be performed at any pH between 6 and 10, but preferably the pH will be between about 7 and 9, this range providing a reaction rate which is sufficiently fast for commercial purposes yet which can be readily controlled.

The temperature of the reaction is most conveniently maintained at reflux, which normally is about 80°–90° C., but lower temperatures above 60° C. may also be used, a longer time being required. The time may be appreciably shortened by the use of higher temperatures than that of reflux, and this may be done by performing the condensation in suitable pressure equipment.

In the condensation, any material supplying $CH_2O$ may be employed including formalin or paraformaldehyde, but when formalin is employed, which normally contains about 30–37% $CH_2O$, water must be distilled, preferably with the syrup under vacuum, when the condensation is completed. This distillation step is necessarily slow and costly. It is therefore a feature of the present invention that the formaldehyde, water and methanol are best added as a preformed solution conforming to the ratios set forth above. Such solutions may be prepared by dissolving paraformaldehyde or gaseous formaldehyde in aqueous methanol.

For use in the manufacture of wet strength paper by the beater addition method, the syrup is dissolved in aqueous hydrochloric acid containing about 0.8 mol of HCl per mol of combined melamine in the syrup and sufficient water is added to form a dispersion containing 6%–12% resin solids. The dispersion is then aged 4–12 hours or longer to permit development of the cationic colloid. The aged dispersion is added directly to a stock of paper-making cellulosic fibers having a pH between 4.5 and 6.5 either in the beater or at any suitable point ahead of the wire, the weight of resin added (solids basis) being between about 0.1–5%, and preferably about 3%, of the weight of the fibers, depending principally on the degree of wet strength desired. The resin colloid is substantially completely adsorbed by the fibers, this taking place in less than 10 minutes.

The fibers are sheeted in the usual manner on a paper making machine such as a Fourdrinier machine, and the paper dried and the strengthening properties of the adsorbed resin developed by heating the paper to between about 105° C. and 150° C. for about ½ to 3 minutes, depending chiefly on the basis weight of the paper.

The sheets thus formed are soft and flexible and can scarcely be distinguished from similar sheets which contain no resin at all, except that the resin-containing sheets exhibit very appreciable resistance to disintegration even when completely wet by water.

When the tub or impregnation methods are employed, unsized paper sheets are passed through or sprayed with the resin syrup or the acid colloid dispersion which preferably has a solids content of about ½% to 3% or more. Thereafter, the paper is heated and dried in the manner described. The paper thus obtained possesses similar wet strength.

For the treatment of textiles the syrup is diluted with water or a 50:50 alcohol-water mixture to 10% solids and a latent curing catalyst such as 3% diammonium phosphate, based on the weight of the resin solids, is added. The textile is padded with the dilute solution to a wet pickup of about 100% based on the weight of the cloth. The fabric is dried and the resin cured by heating in an oven for about 10 to 15 minutes at about 250° to 300° F. Alternatively, the syrup may be dissolved in dilute acid, preferably acetic or lactic, about 3 mols of acid being used per mol of combined melamine in the syrup. The solution is then diluted to 10% solids with water, aged about 12 hours to form the acid colloid, and the resulting dispersion applied as described. The primary effect of this treatment is to crease-proof the fabric and to reduce its tendency to shrink.

The syrups of the present invention are also useful for the tanning of leather and as adhesives and laminating syrups. The cationic acid colloids when applied to sheets of regenerated cellulose act as an anchoring medium or coating for printing inks and moisture vapor barrier films including wax-containing nitrocellulose lacquers.

The invention has been fully disclosed above. The following examples set forth specific embodiments of the invention. They are intended solely for the purpose of illustrating practical methods for the application thereof, and do not constitute any limitation thereon. Parts are by weight unless otherwise noted.

*Example 1*

The following reaction mixture was prepared:

| Reagents | Mols | Parts |
| --- | --- | --- |
| Melamine | 1 | 126 |
| Urea | 2 | 120 |
| $CH_2O$ | 7.35 | 220 |
| Methanol | 3.9 | 124.5 |
| Water | 3.4 | 60.5 |

The formaldehyde, methanol and water were charged as a concentrated solution formed by dissolving paraformaldehyde in aqueous methanol to form a solution containing 54.4% formaldehyde, 30.7% methanol, and 14.9% water.

The reagents were placed in a reaction vessel fitted with a reflux condenser, stirrer, and thermometer and the pH adjusted to 7.9 by the addition of about 24 parts of triethanolamine. The mixture was heated to reflux (83° C.) and refluxed gently for 30 minutes. By the end of that time, a clear solution had formed.

The solution was cooled to room temperature and its pH lowered to 6.5 by the addition of 10.5 parts of oxalic acid crystals. The reaction mixture was reheated at reflux for 20 minutes as before. It was then cooled. Its viscosity was T at 25° C. on the Gardner-Holdt scale. Its pH was adjusted to 8 by the addition of aqueous NaOH. The syrup had a resin content of about 68% by weight and remained stable and usable for more than 6 months.

*Example 2*

The following reaction mixture was prepared:

| Reagents | Mols | Parts |
| --- | --- | --- |
| Melamine | 1 | 126 |
| Urea | 1.5 | 90 |
| $CH_2O$ | 6.3 | 189 |
| Methanol | 3.3 | 106.5 |
| Water | 2.9 | 52 |

The formaldehyde, methanol, and water were added as the solution described in Example 1. The reaction mixture was charged in the apparatus of Example 1 and the pH adjusted to 8, by the addition of about 5 parts of triethanolamine. After a few minutes of refluxing, the mixture became clear and homogeneous and was completely soluble in water. At the end of about 45 minutes of refluxing, the syrup was in the 0° C. hydrophobic stage, and its viscosity had reached N as determined by the method of Example 1. The product was cooled to room temperature. The solids content of the syrup was about 72% by weight, and the syrup remained stable for more than 6 months.

*Example 3*

A reaction mixture was prepared as follows:

| Reagents | Mols | Parts |
| --- | --- | --- |
| Melamine | 1 | 126 |
| Urea | 1 | 60 |
| $CH_2O$ | 5.5 | 165 |
| Methanol | 2.6 | 84 |
| Water | 2.4 | 44 |

The formaldehyde, methanol, and water were supplied as a solution containing by weight 56.4% $CH_2O$, 28.7% $CH_3OH$ and 14.9% water. The reagents were mixed and the pH of the mixture adjusted to 8, first by the addition of 4.4 parts of triethanolamine and then by the addition of aqueous NaOH. The mixture was refluxed in the apparatus of Example 1 until its viscosity at 25° C. (Gardner-Holdt method) had increased to Q. The syrup was cooled and its pH adjusted to 8.6. The syrup had a solids content of about 73%. It remained substantially unchanged and was fully useful after 6 months of storage.

*Example 4*

A reaction mixture was prepared as follows:

| Reagents | Mols | Parts |
|---|---|---|
| Melamine | 1 | 126 |
| Urea | 1 | 60 |
| CH$_2$O (as 91% paraformaldehyde) | 5.5 | 181 |
| Methanol | 2.65 | 85 |
| Water | 1.5 | 27 |

The paraformaldehyde was dissolved in the methanol and the water. To this solution was added urea and the melamine. The pH of the mixture was adjusted to 8 with aqueous NaOH and then heated at reflux in the apparatus of Example 1 for about 1.5 hours. When the viscosity reached S on the Gardner-Holdt scale at 25° C., the product was cooled to room temperature and its pH adjusted to 8.5. The solids content of the syrup was about 73% by weight. The syrup remained stable and usable for more than 6 months.

*Example 5*

Four acid solutions were prepared by diluting the volumes of 1.6% HCl shown in the table below with distilled water to 160 ml. To these were added, respectively, the resinous syrups of Examples 1, 2, and 3, in the amounts shown in the table below. Before use, the syrups had been stored for more than 6 months. The solutions were then diluted to 208 ml. with water. The concentration of the resin in each solution was equivalent to 12 g. of resin solid per 100 ml. of solution. The dispersions were aged for 4 hours, at which time the characteristic blue haze of colloids became noticeable in each. The dispersions were stable and exhibited no tendency to flocculate or precipitate.

A paper pulp stock was prepared by beating bleached northern kraft pulp to a Green freeness of 500 ml. The stock was divided into aliquots. To each was added with gentle stirring one of the aged resin dispersions designated above, the amount of the resin added (solids basis) being in each instance 3% of the dry weight of the fibers. The stocks were adjusted to a pH of 4.5 with dilute HCl and aged for 15 minutes during which time substantially all of the resin colloid was adsorbed on the fibers. The stocks were formed into handsheets in a Nash handsheet machine. The sheets were pressed between blotters and dried at 240° F. at 2 minutes in a Noble & Wood dryer. All sheets were tested in comparison with an untreated control for their dry and wet strengths by the Schopper tensile tester. Results are as follows:

|  | Syrups Used | | | Control |
|---|---|---|---|---|
|  | Ex. 1 | Ex. 2 | Ex. 3 | |
| Preparation of Acid Colloid: | | | | |
| Syrup, gm | a 36.6 | a 36.8 | a 37.2 | None |
| 1.6% HCl, ml | 91 | 125 | 131.5 | -------- |
| Volume after dil'n with H$_2$O, ml | 208 | 208 | 208 | -------- |
| Handsheets: | | | | |
| Basis weight b | 47.8 | 47.7 | 50.2 | 48.2 |
| Dry tensile, lb./in | 34.0 | 32.8 | 31.8 | 25.1 |
| Wet tensile, lb./in | 9.4 | 9.5 | 8.9 | 0.6 | a Contained 25 g. of resin (solids basis).
b Basis wt. lb. per ream 25" x 40"/500.

The wet strength values obtained in tests set forth above are excellent as compared with the values obtained by the best previously known melamine or urea resins.

*Example 6*

38 g. of glacial acetic acid were added to 620 g. of water and to the mixture was added with stirring 100 g. of resinous syrup prepared in accordance with Example 3. The dispersion was aged overnight. The dispersion was poured into a tray and through this was passed strips of woolen felt and cotton denim. The cloth samples after being pressed through squeeze rolls to 100% pickup were dried in an oven dryer for 15 minutes at 250° F. The resin treatment gave marked reduction of washing shrinkage for the wool samples and excellent shrinkage reduction and crease resistance for the cotton samples.

We claim:

1. The water-dilutable resinous product of the condensation of urea, melamine, formaldehyde and methanol in the presence of water, the molar ratio of said urea to said melamine being between about 1.0 and 2.0; the molar ratio of said formaldehyde to the amino groups of said urea and said melamine being between about 0.9 and 1.3; the molar ratio of said methanol to said formaldehyde being between about 0.4 and 1.0; and the molar ratio of said water to said methanol being between about 0.6 and 1.2, said product being a stable "0° C. hydrophobe syrup" of pumpable viscosity having a temperature below 40° C. and a pH between about 7.0 and 10.0.

2. A process of preparing a stable, pumpable, thermosetting water-dilutable melamine-urea-formaldehyde resinous syrup which comprises reacting urea, melamine, formaldehyde and methanol in the presence of water, the molar ratio of said urea to said melamine being between about 1.0 and 2.0, the molar ratio of said formaldehyde to the amino groups of said urea and said melamine being between about 0.9 and 1.3, the molar ratio of said methanol to said formaldehyde being between about 0.4 and 1.0, and the molar ratio of said water to said methanol being between about 0.6 and 1.2, at a pH of between about 6.0 and 10 at least sufficiently long to form a "0° C. hydrophobe" syrup of pumpable viscosity, cooling the syrup to below 40° C. and adjusting its pH to between 7.5 and 10.

3. A process according to claim 2 wherein the pH of the reaction is between about 7 and 9.

4. A process according to claim 2 wherein the reaction is continued until the viscosity of the syrup is between about N and W as determined by the Gardner-Holdt method at 25° C.

5. A process according to claim 2 wherein the pH of the cooled syrup is adjusted to between about 7.5 and 9.

References Cited in the file of this patent

UNITED STATES PATENTS

| 2,197,357 | Widmer et al. | Apr. 16, 1940 |
| 2,325,302 | Britt | July 27, 1943 |
| 2,338,602 | Schur | Jan. 4, 1944 |
| 2,485,080 | Wohnsiedler | Oct. 18, 1949 |
| 2,548,513 | Boughton | Apr. 10, 1951 |
| 2,601,598 | Daniel et al. | June 24, 1952 |
| 2,684,347 | Nickerson | July 20, 1954 |

FOREIGN PATENTS

| 654,305 | Great Britain | June 13, 1951 |